United States Patent
Osterberg, Jr.

(10) Patent No.: US 8,266,217 B2
(45) Date of Patent: Sep. 11, 2012

(54) UNSOLICITED ELECTRONIC MESSAGE SOURCE VERIFICATION AND TRACKING SYSTEM AND METHOD

(75) Inventor: Donald H. Osterberg, Jr., Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1197 days.

(21) Appl. No.: 10/698,813

(22) Filed: Oct. 30, 2003

(65) Prior Publication Data

US 2009/0089375 A1    Apr. 2, 2009

(51) Int. Cl.
 *G06F 15/16* (2006.01)
(52) U.S. Cl. ...................................... 709/206
(58) Field of Classification Search .................... 709/206
 See application file for complete search history.

(56) References Cited

U.S. PATENT DOCUMENTS

| | | | | |
|---|---|---|---|---|
| 6,167,435 A * | 12/2000 | Druckenmiller et al. | ..... | 709/206 |
| 6,721,784 B1 * | 4/2004 | Leonard et al. | ............... | 709/206 |
| 7,249,175 B1 * | 7/2007 | Donaldson | .................... | 709/225 |
| 7,447,744 B2 * | 11/2008 | Wallace et al. | ............... | 709/206 |
| 2002/0023138 A1 * | 2/2002 | Quine et al. | .................. | 709/206 |
| 2002/0194308 A1 * | 12/2002 | Hall | ............................... | 709/219 |
| 2003/0182239 A1 * | 9/2003 | Auzoux | .......................... | 705/64 |
| 2003/0200267 A1 * | 10/2003 | Garrigues | ...................... | 709/206 |
| 2003/0233418 A1 * | 12/2003 | Goldman | ........................ | 709/206 |
| 2003/0236847 A1 * | 12/2003 | Benowitz et al. | .............. | 709/206 |
| 2004/0068542 A1 * | 4/2004 | Lalonde et al. | ................ | 709/206 |
| 2005/0044155 A1 * | 2/2005 | Kaminski et al. | .............. | 709/206 |
| 2005/0080860 A1 * | 4/2005 | Daniell et al. | ................. | 709/206 |
| 2005/0188044 A1 * | 8/2005 | Fleming, III | ................... | 709/206 |
| 2005/0188045 A1 * | 8/2005 | Katsikas | ........................ | 709/206 |
| 2006/0010210 A1 * | 1/2006 | Keller | ............................ | 709/206 |

* cited by examiner

*Primary Examiner* — Brian P Whipple
(74) *Attorney, Agent, or Firm* — Kilpatrick Townsend & Stockton LLP

(57) ABSTRACT

An unsolicited electronic message source verification and tracking method and system for providing an efficient and convenient mechanism for tracking identification of unsolicited electronic message (e.g., e-mails) sources is presented. In one embodiment, a request for authorization to forward an electronic message is received. The request for authorization includes a request source address. A response is sent including an authorization indicator (e.g., a unique bit string) is sent to the request source address. An electronic message is received and a determination is made if the electronic message includes a valid authorization indictor. If the electronic message does include a valid authorization indicator the electronic message is associated with the request source address and the association is tracked. In one exemplary implementation, a source address included in the electronic message is compared to the request source address and discrepancies are noted.

9 Claims, 5 Drawing Sheets

US 8,266,217 B2

UNSOLICITED ELECTRONIC MESSAGE SOURCE VERIFICATION AND TRACKING SYSTEM AND METHOD

BACKGROUND

1. Field of the Invention

The present invention relates to the field of data processing. More specifically, embodiments of the present invention relate to a computer implemented method and system for verifying and tracking sources of unsolicited electronic messages.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These advantageous results are often realized through networked devices that enable information to be communicated between the devices. As organizations and individuals utilize increasingly distributed and open communication environments, the use of electronic messaging has increased substantially and become an important method of communication for many individuals and organizations. However, a number of organizations and individuals forward unsolicited messages addressed to recipients that have no desire to read the messages.

Electronic messaging, including electronic mail (e-mail) messages, provides a convenient and easy means for two or more individuals to communicate information in text messages, pictures, or almost any electronic file. Some organizations use electronic messaging as a bulk communication mechanism for distributing information to a mass audience. These messages are often unsolicited, unwanted and often referred to as "spam". Spam activity can be extremely high and cover a wide variety of subjects. Given the diversity of subjects and the unsolicited nature of spam, most recipients have no desire to receive or read most of the spam messages. Further aggravating the situation is the large number of spam initiators and the fact that any given initiator may forward multiple messages. The large volume of messages usually produces a number of inconveniences for the recipients.

The typical high volume of e-mail messages usually requires a significant expenditure of resources to deal with the e-mails. Most e-mail messages are stored by default in a single electronic mailbox or folder until the recipient of the e-mail processes them individually. When the number of incoming messages is very large, the process of manually determining an appropriate action (e.g., opening or deleting an e-mail) consumes significant time and resources. Expending the time and resources on dealing with unwanted messages is usually wasteful and very aggravating.

In addition to being aggravating, communicating junk mail and spam usually occupy valuable communication resources. The amount of bandwidth that can be communicated on any given system at a particular time is usually limited. If a system is inundated with numerous spam and junk mail messages it can delay the communication of other important messages and adversely impact other processes.

Spam initiators have typically found ways to overcome or side step traditional attempts at preventing "spam" messages. Some traditional e-mail applications may attempt to have a recipient identify a message as spam and block future messages from the same address. This preventive measure has typically been easily overcome by spam initiators using misleading source identifications. For example, a spam initiator can include an erroneous or fake source internet protocol (IP) address as a source address in a communication header packet header. The task of accurately identifying sources of spam messages is even more difficult when a spam message includes a forged or "spoofed" address of a reputable host source and includes the address of the reputable source in the header of the spam e-mail.

SUMMARY OF THE INVENTION

An unsolicited electronic message source verification and tracking method and system for providing an efficient and convenient mechanism for tracking identification of unsolicited electronic message (e.g., e-mails) sources is presented. In one embodiment of the present invention, a request for authorization to forward an electronic message is received. The request for authorization includes a request source address. A response including an authorization indicator is sent to the source address of the request for authorization. The authorization indicator can be a special (e.g. unique) bit string. An electronic message is received and a determination is made if the electronic message includes a valid authorization indictor. If the electronic message does include a valid authorization indicator the electronic message is associated with the request source address and the association is tracked. In one exemplary implementation, a source address included in the electronic message is compared to the request source address and discrepancies are noted. The special nature (e.g., uniqueness) of the authorization bit string indicates that the string passed through the request source (e.g., IP address) it was forwarded to. Since the e-mail passed through the request source (e.g., IP address) it provides an indication that the user at the request source or address is involved in the propagation of the electronic message. Having a reliable means of identifying a source address which is involved in the propagation of the electronic message permits accountability and responsibility for propagating the electronic message to be assigned to the verified source address.

BRIEF DESCRIPTION OF THE DRAWINGS

The accompanying drawings, which are incorporated in and form apart of this specification, illustrate embodiments of the invention and, together with the description, serve to explain the principles of the invention.

DETAILED DESCRIPTION OF THE INVENTION

Figure 1:
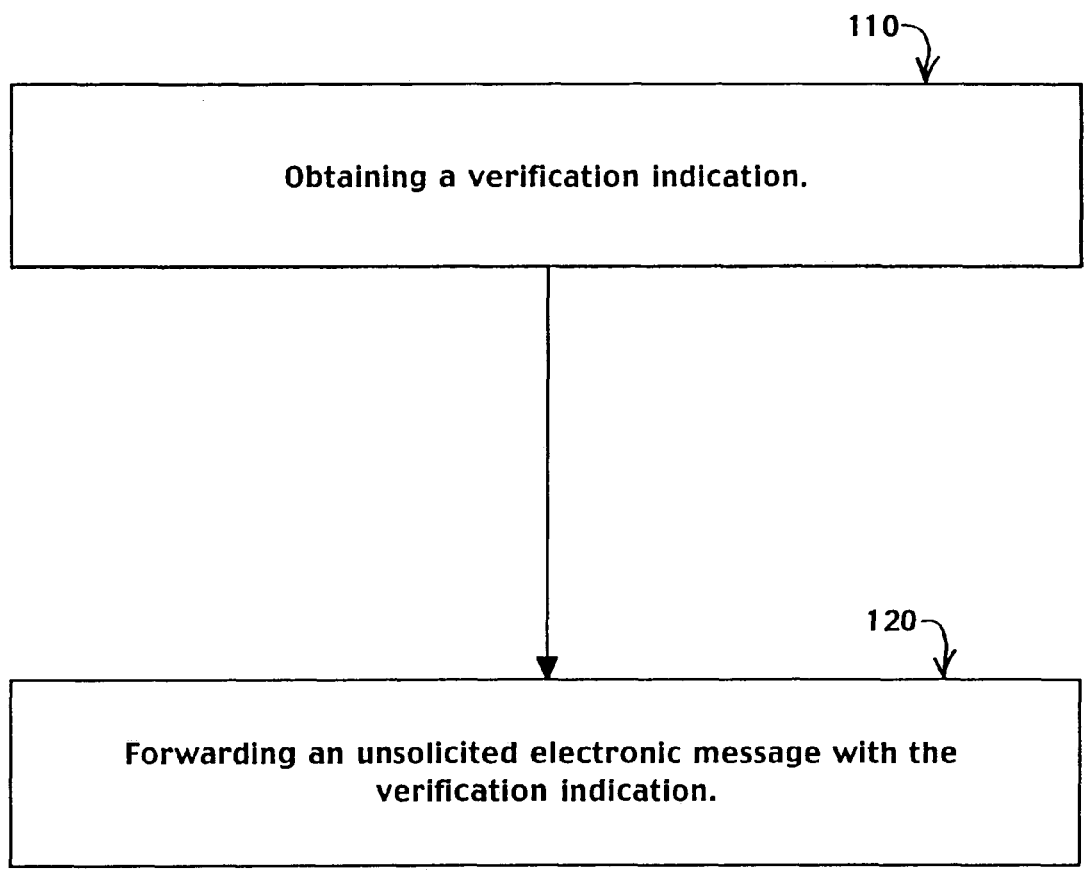
FIG. 1 is a flow chart of unsolicited electronic message source tracking method 100 in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

A present invention unsolicited e-mail source verification and tracking method and system provides an efficient and convenient accountability tracking mechanism for unsolicited electronic messages (e.g., e-mails) propagators (e.g., spam initiators). An unsolicited e-mail verification and tracking system and method provides an unauthorized electronic messages origination source indication. The system and method provides verification of the source identification and facilitates detection of forged and/or "cloaked" source identification indicators (e.g., a source IP address). The unsolicited e-mail verification and tracking system and method can also facilitate the policing of network traffic and can assist "spam" deterrence programs by assigning accountability for generating the unwanted messages.

FIG. 1 is a flow chart of unsolicited electronic message source tracking method 100 in accordance with one embodiment of the present invention. Unsolicited electronic message source tracking method 100 provides electronic message source identification verification and tracking. Electronic message source identifications are tracked and electronic messages without valid authorization and/or source identification are noted.

In step 110, a verification indication is obtained. In one embodiment of the present invention, an originator or source of an electronic message (e.g., e-mail) transmits a request-to-send the electronic message. For example, the request-to-send can be sent to a simple mail transfer protocol (SMTP) agent supporting e-mail service for an end use destination. The request-to-send includes an indication of the sender's or source identification (e.g., an internet protocol (IP) address). If the sender provided a valid source identification (e.g., IP address) the request sender (e.g., source of the request-to-send) receives a response with a verification indicator (e.g., a special or unique authorization bit string). For example, an SMTP agent forwards a verification indicator to the request sender or source attempting to forward an unsolicited e-mail.

In step 120, the source of an unsolicited electronic message (e.g., e-mail) forwards the electronic message including the verification indicator (e.g., a special or unique authorization bit string). For example, a special authorization bit string can be included in the header of an e-mail message. The special nature (e.g., uniqueness) of the authorization bit string indicates that the string passed through the source (e.g., IP address) it was forwarded to in step 110. Since the e-mail passed through the source (e.g., IP address) it provides an indication that the user at the source or address is involved in the origination of the electronic message. In one embodiment, an actual e-mail message also includes a source address (e.g., also included in the header). The source address included in the e-mail message header can be compared to the source address the verification indicator was sent to in step 110 to identify and track discrepancies.

Figure 2:
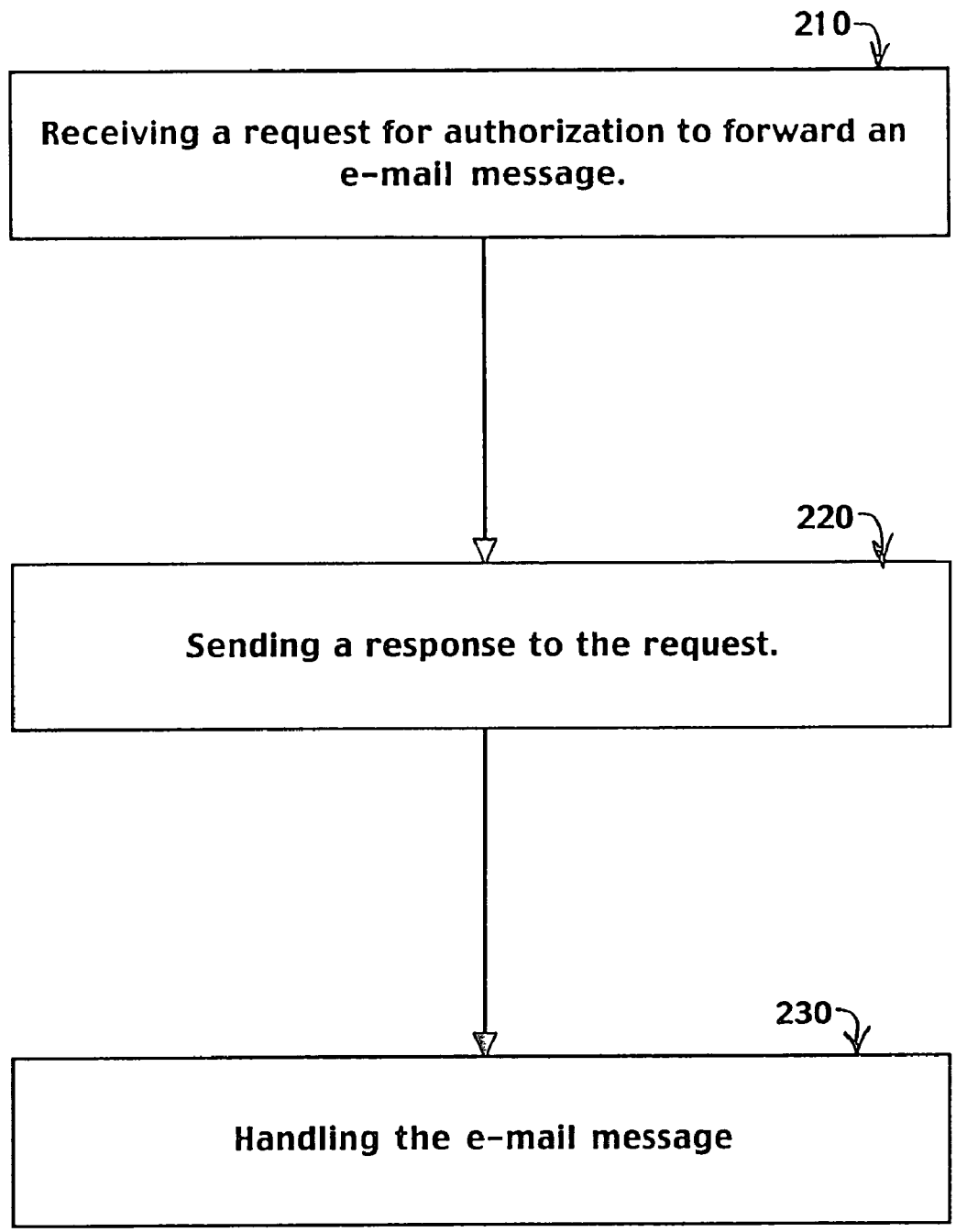
FIG. 2 is a flow chart of unsolicited e-mail internet protocol source address verification method 200 in accordance with one embodiment of the present invention.

FIG. 2 is a flow chart of unsolicited e-mail internet protocol (IP) source address verification method 200 in accordance with one embodiment of the present invention. Unsolicited e-mail IP source address verification method 200 tracks accountability for forwarding e-mail messages. A special (e.g., unique) authorization string is generated by unsolicited e-mail IP source address verification method 200 and "associated" with a sender's address. The combined uniqueness of the authorization string and the association with a particular source address provides an accountability tracking mechanism.

In step 210, a request for authorization to forward an electronic mail (e-mail) message is received. In one exemplary implementation, the request is initiated by the source originating or forwarding the e-mail message. The request asks for permission or authorization to send an e-mail message to a particular destination (e.g., an internet service provider (ISP) customer). In one embodiment of the present invention, the request is sent to an intermediate network resource (e.g., ISP resources, an intermediate SMTP agent, etc.) en route to a different ultimate destination (e.g., end user). The request also includes an address of the request source.

In step 220, an authorization response is sent. In one exemplary implementation, the authorization response includes an authorization indicator. The authorization indicator indicates that the request source is authorized to forward an e-mail message. The authorization response is sent to the same initiation or source address identified in the request of step 210. If the request does not include an initiation address the communication is terminated. In one embodiment of the present invention, an authorization indication generator process is performed in which the authorization indicator is generated. In one exemplary implementation, the authorization indicator is a special (e.g., unique) sequence of bits. The sequence of bits can correspond to a variety of items. For example, the sequence of bits can correspond to a key. Alternatively, the sequence of bits can be encoded.

The authorization indicator is forwarded to the source identified in the request. In one exemplary implementation, the request source address is extracted or parsed from a header in a communication package received in step 210. The extracted address is then utilized as a destination address in a header file of a return or response package with the authorization information (e.g., unique bit string).

A received e-mail message is handled in step 230. In one embodiment of the present invention, the source address included in the received e-mail message is compared to the address the authorization indicator was sent to. In one exemplary implementation, the intermediate network resource (e.g., ISP resources, an intermediate SMTP agent, etc.) inserts an entry into the e-mail message indicating the address the authorization was sent to before forwarding the e-mail message on towards its final end use destination.

In one embodiment of the present invention, step 230 includes identifying received e-mail for "Spam". For example, a user reviews the e-mail and marks it as including "Spam". The sender of the "Spam" is identified by reviewing the source identification (e.g., IP address) to which the authorization was sent.

In one embodiment of the present invention, the request is part of communication initialization ("handshaking") protocol to establish a communication link. When trying to setup a connection, a source device send pieces of information called packets with a request to set up a connection with a destination device. The destination device sends a packet back indicating a communication link can be established. A variety of protocol issues can be resolved (e.g., the type of port, messages, etc.). For example, the destination device can indicate that communications are to be addressed to a particular port on the destination device. In one exemplary implementation, the authorization request and response (e.g., an authorization indicator) is included in the handshaking packets going back and forth between the source and destination.

In one embodiment of the present invention, including a valid authorization or verification indicator in an e-mail header is optional. For example, if a legacy system is not equipped or programmed to participate in unsolicited e-mail internet protocol (IP) source address verification method 200, then an STMP agent can optionally permit the e-mail transmission to proceed without obtaining a proper authorization indicator. A message can be forwarded to the request initiator (e.g., a postmaster at the sender) that the requesting agent is not configuring a proper request-to-send (e.g., the agent is out of date) and should be upgraded to communicate properly with the receiver. In one exemplary implementation, if the request initiator does not properly participate in unsolicited e-mail internet protocol (IP) source address verification method 200 after a predetermined time of being warned, unsolicited e-mail internet protocol (IP) source address verification method 200 can return to denying authorization to forward a message.

It is appreciated that the source verification and tracking features of the present invention can be utilized to also facilitate a variety of other e-mail message management capabilities. For example, present invention source verification and tracking information can be utilized to facilitate blocking functions. In one embodiment, a determination is made if there is a reason to deny authorization and not forward a verification indicator. A list of unauthorized addresses can be maintained. For example, the list can include addresses that have previously been identified as sources associated with forwarding "spam". The address of the request source (e.g., from step 110, 210, etc.) is compared to the list of unauthorized source identifications (e.g., IP addresses). If the source identification or address of the requesting device is on the list of unauthorized sources, an authorization indication is not forwarded and e-mail messages from the source are blocked.

In one embodiment of the present invention, content related information included in the header is also checked in case someone illicitly obtains the authorization indicator. The content related information can be a short piece of information related to the e-mail message. For example, a hash digest of the e-mail body text or possibly select portions of a header other than a portion of the header designated for authorization information (e.g., the subject or first predetermined number of characters of the email itself). The content related information is something that can be checked against the email that eventually is received to ensure it deals with the same subject matter (e.g., "matches") as indicated in the request. Checking the content related information helps increase security in case someone is listening on the line or snooping the authorization indicator and creates a misleading or "bogus" e-mail with the "snooped" legitimate indicator. Underlying layers of security can be added through various other layers of callback mechanisms.

Figure 3A:
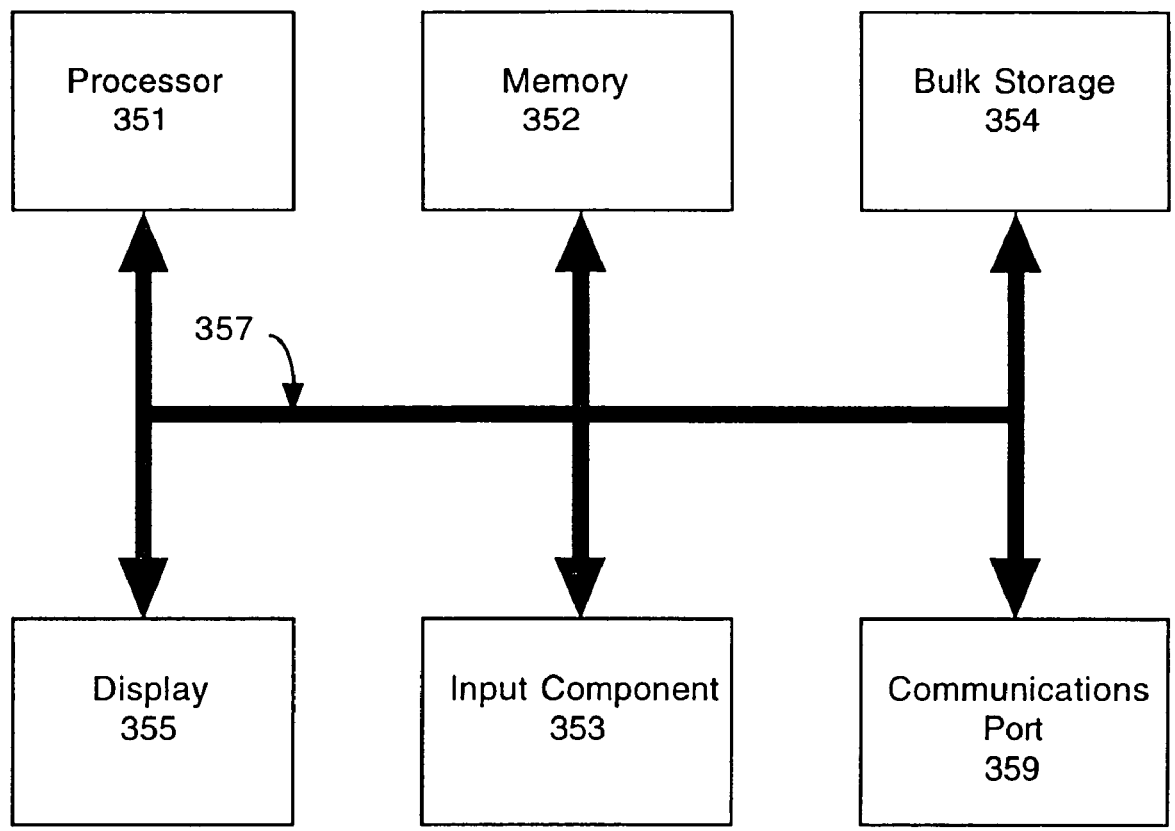
FIG. 3A is a block diagram of one embodiment of a computer system on which the present invention can be implemented.

FIG. 3A is a block diagram of a computer system 350, one embodiment of a computer system on which the present invention may be implemented. For example, computer system 350 can be utilized to implement unsolicited electronic message source tracking method 100, unsolicited e-mail IP source address verification method 200, and/or unsolicited electronic message initiation tracking method 400. Computer system 350 includes communication bus 357, processor 351, memory 352, input component 353, bulk storage component 354 (e.g., a disk drive), network communication port 359 and display module 355. Communication bus 357 is coupled to central processor 351, memory 352, input component 353, bulk storage-component 354, network communication port 359 and display module 355.

The components of computer system 350 cooperatively function to provide a variety of functions, including performing emulation application revision in accordance with the present invention. Communication bus 307 communicates information. Processor 351 processes information and instructions, including instructions for verifying and tracking unsolicited electronic message source identifications. For example, the instructions can include determination of proper authorization and accountability tracking for e-mail messages. Memory 352 stores information and instructions, including for instructions verifying and tracking unsolicited electronic message source identifications. Bulk storage component 354 also provides storage of information. Input component 353 facilitates communication of information to computer system 350. Display module 355 displays information to a user. Network communication port 359 provides a communication port for communicatively coupling with a network.

Figure 3B:
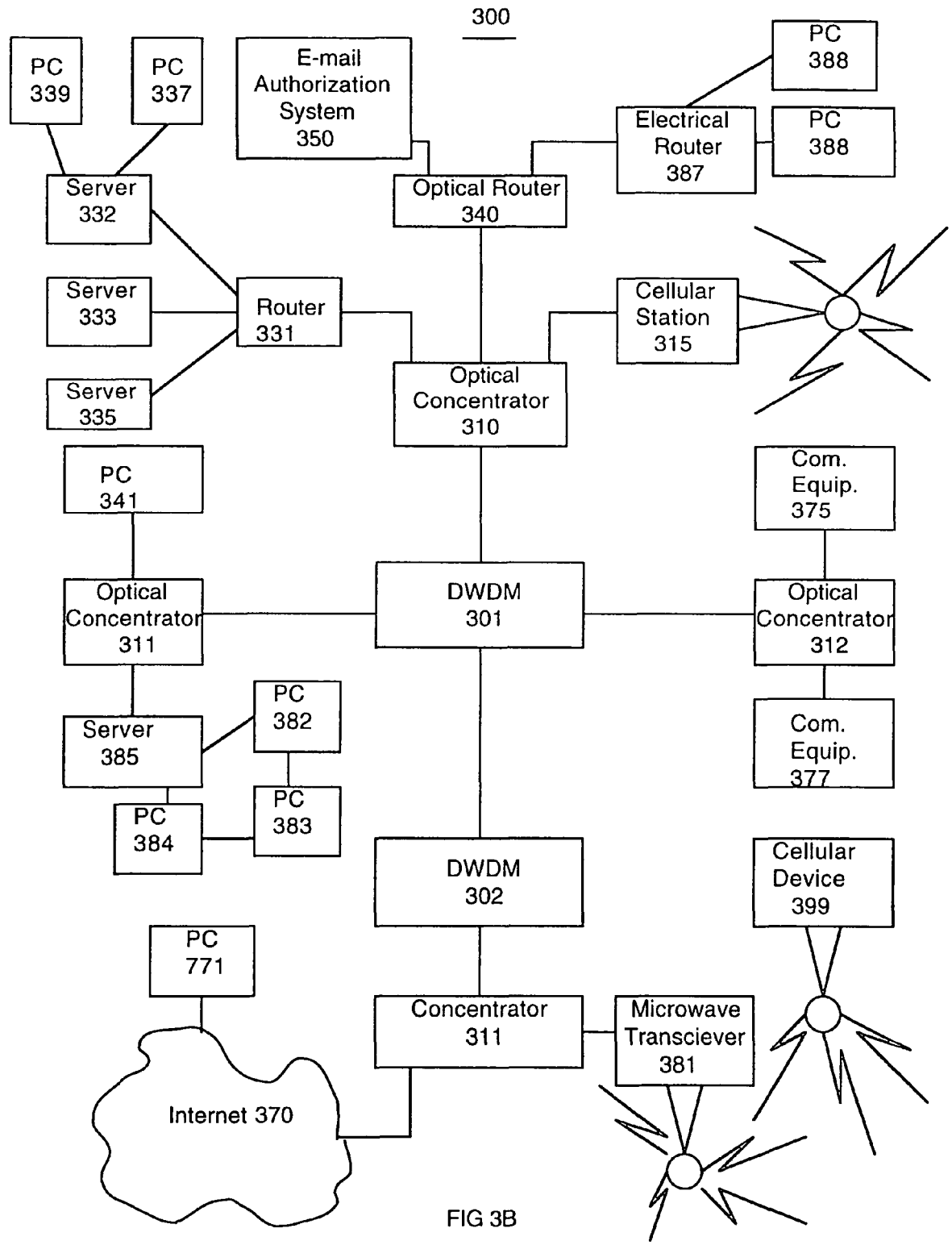
FIG. 3B is a block diagram an exemplary communication network in accordance with one embodiment of the present invention.

In one embodiment, the present invention is implemented on devices (a computer system, embedded devices, etc.) connected via a communication network. FIG. 3B is a block diagram of communication network 300, one exemplary communication network in accordance with the present invention. In one embodiment of the present invention, unsolicited e-mail authorization, source verification and tracking information are communicated via communications network 300. Communication network 300 comprises computer system 350 for implementing electronic message source verification and tracking, dense wave division multiplexer (DWDM) 301 and 302, optical concentrators 310, 311, 312 and 317, routers 331, 340 and 87, cellular station 315, cellular device (e.g., phone, handheld computer, etc.) 399, microwave transceiver 381, Internet 370, servers 385, 332, 333 and 335, personal computers 337, 339, 341, 371, 382, 383, 384, 388 and 389, and miscellaneous communication equipment 375 and 377. The components of communications network 300 communicate with each other over a variety of architectures utilizing numerous communication protocols. One exemplary implementation of communications network 300 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Figure 4:
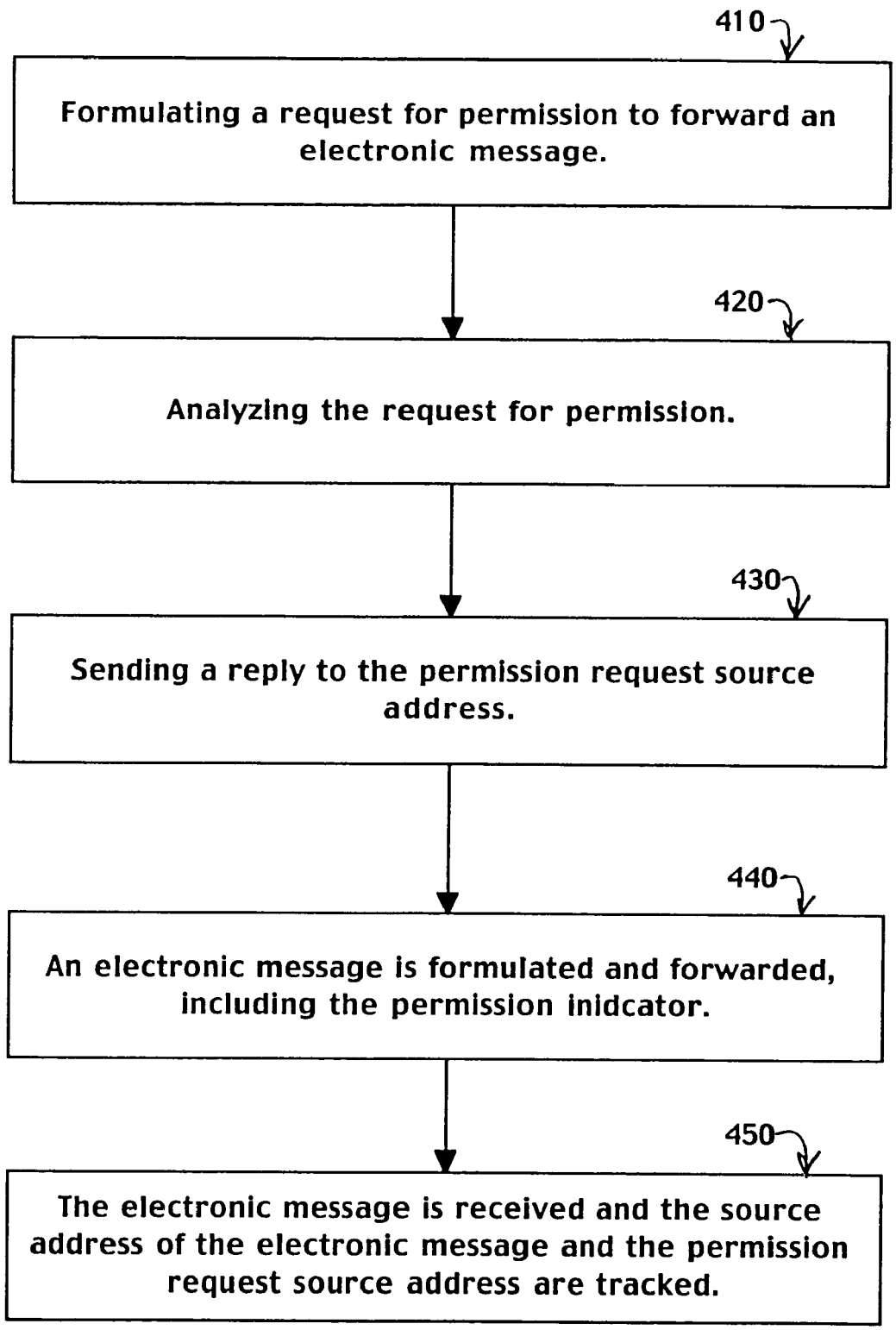
FIG. 4 is a flow chart of an unsolicited electronic message initiation tracking method in accordance with one embodiment of the present invention.
Figure 4:
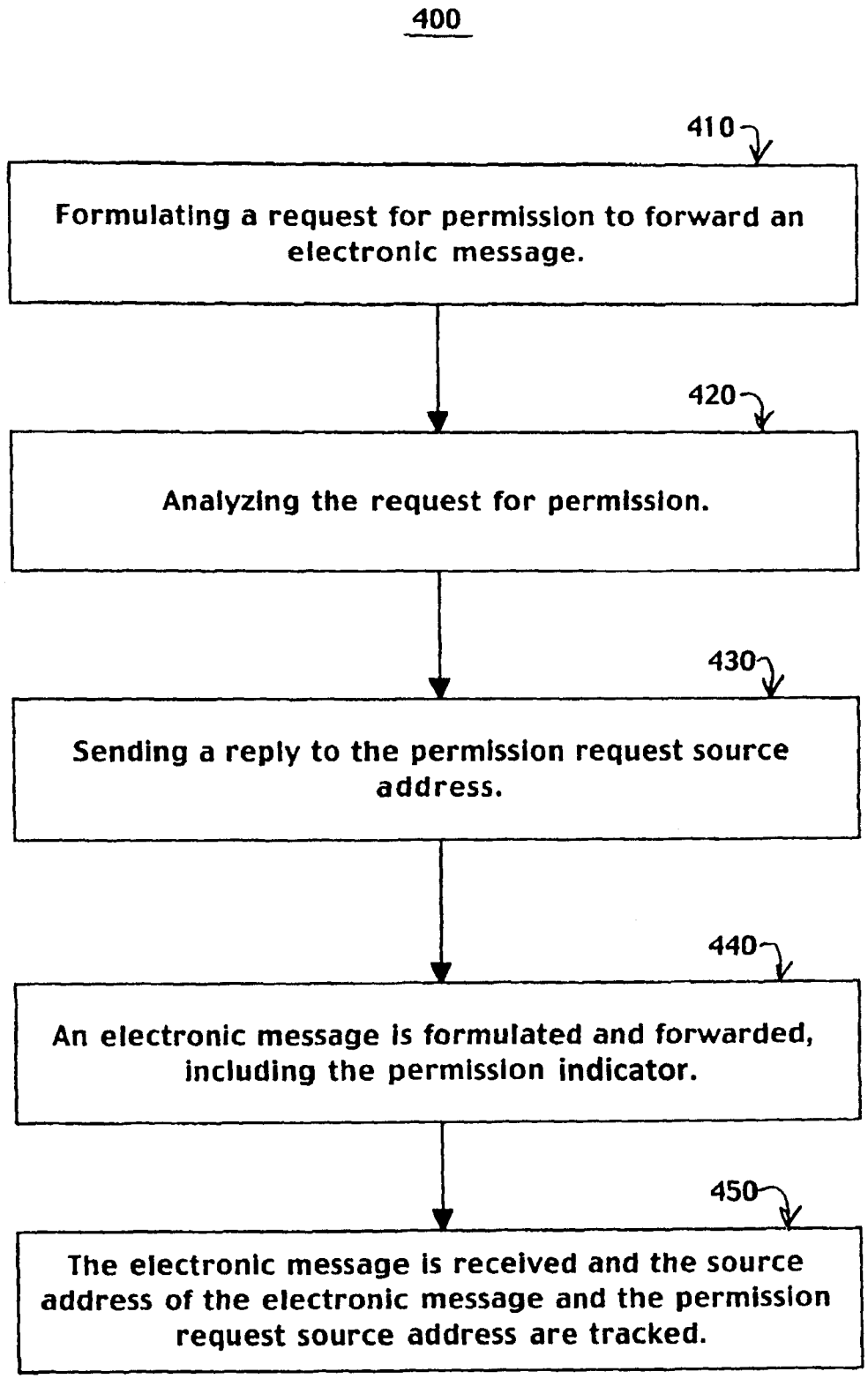

FIG. 4 is a flow chart of unsolicited electronic message initiation tracking method 400, in accordance with one embodiment of the present invention. Unsolicited electronic message initiation accountability tracking method 400 facilitates tracking of electronic message initiation. For example, the source address of "spam" initiators can be tracked.

In step 410, a request for permission to forward an electronic message is formulated. In one embodiment, a message initiator inserts an indication in a header of a communication packet (e.g., in a handshaking packet) that the initiator is attempting to establish a communication link for the purpose of forwarding a message to a particular destination. The initiator also includes an indication of the initiator source address (e.g., IP address) in the header. In one exemplary implementation, the communication link is broken after the request for permission is forwarded In step 420, the request for permission is analyzed. For example, the header of a communication packet is examined for an indication of a source address. If the header does not have a source address, permission to forward an e-mail is denied and the communication link is not established. In one exemplary implementation, a preliminary reply asking for the source address is forwarded and an opportunity is given to the initiating source to provide an address.

In step 430, a permission reply is sent to the permission request source address. For example, the permission reply is sent to the source address identified in step 420. The permission reply includes a permission indicator (e.g., a unique or special sequence of bits). In one embodiment of the present invention, a time stamp is maintained of when a permission indicator (e.g., a unique key) is generated. In one exemplary implementation, a second link or connection is established to send the permission reply.

In step 440, an electronic message (e.g., an e-mail message) is formulated and forwarded, including the permission indicator in the header. The header also includes an electronic message source address indication. In one exemplary implementation, a third link or connection is established to send the electronic message.

In step 450, the electronic message of step 440 is received and the source address of the electronic message and the permission request source address from step 410 are tracked. A permission indicator in a header packet is examined for validity. If the permission indicator is valid (e.g., corresponds to permission indicator included in the reply of step 430) the electronic message of step 440 is forwarded. In one exemplary implementation, if the permission indicator is not valid the communication link is terminated. In one embodiment, the duration between the issuance of permission and the time when a message with the permission is returned is checked against a list of time stamps. If a predetermined duration is exceeded the message can be denied (e.g., not forwarded) regardless of having an otherwise valid permission indicator.

Thus, the present invention unsolicited e-mail authorization method and system provides an efficient and convenient unsolicited electronic messages (e.g., e-mails) source verification and tracking mechanism. The unsolicited e-mail authorization method and system facilitates verifiable identification of unwanted e-mail (e.g. "Spam") sender and eases e-mail management activities. A source address forwarding unsolicited e-mail is identified and tracked, permitting accountability and responsibility for forwarding the e-mail to be assigned to the source address.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

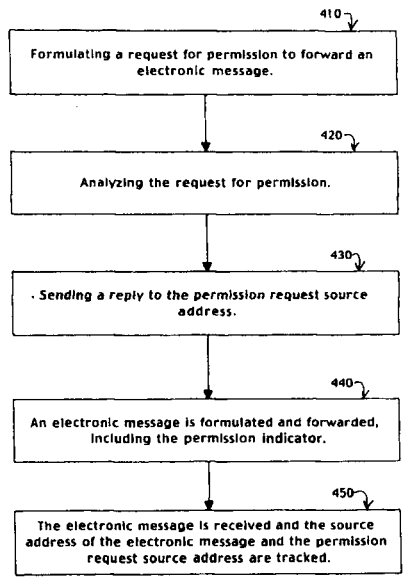

What is claimed is:

1. An unsolicited e-mail Internet protocol source address verification and tracking method comprising:

sending from a source device a request for authorization to send an electronic mail message, the request identifying an address of the source of the request;

receiving at an e-mail authorization system from the source device the request for authorization to send the electronic mail message;

authorizing the request with the e-mail authorization system including generating an authorization indicator that includes the address of the source device sending said request for authorization;

sending a response to the request for authorization from the e-mail authorization system to the address of the source device, wherein the response to said request for authorization includes the authorization indicator with the included address of the source device sending said request for authorization;

receiving at the source device from the e-mail authorization system the authorization indicator;

adding by the source device the received authorization indicator to an electronic mail message;

sending the electronic mail message with the added authorization indicator and an indication of the address of the source device sending the electronic mail message from the source device to a destination device;

receiving the electronic mail message with the added authorization indicator and indication of the address of the source device sending the electronic mail message from the source device at an intermediate mail agent for the destination device; and handling receipt of said electronic mail message at the intermediate mail agent for the destination device, including comparing the indication of the address of the source device sending the electronic mail message included in the received electronic mail message against the address of the source device sending said request for authorization included in the authorization indicator received in the electronic mail message.

2. The unsolicited e-mail Internet protocol source address verification and tracking method of claim 1 wherein said authorization indicator is a unique bit string and further identifies an address of the e-mail authorization system.

3. The unsolicited e-mail Internet protocol source address verification and tracking method of claim 1 further comprising tracking the address of the source device with the e-mail authorization system.

4. The unsolicited e-mail Internet protocol source address verification and tracking method of claim 2 wherein generating the authorization indicator comprises:
   extracting a request source address from said request;
   generating a key uniquely identifying the source device and based on the address of the source device indicated in the request; and
   utilizing said request source address as a destination address in a header file of a return package including authorization indictor information.

5. A system comprising:
   a destination device;
   a source device communicatively coupled with the destination device;
   an e-mail authorization system communicatively coupled with the source device, wherein the source device:
      sends to the e-mail authorization system a request for authorization to send an electronic mail message to the destination device,
   wherein the e-mail authorization system:
      receives from the source device the request for authorization to send the electronic mail message,
      generates an authorization indicator that includes the address of the source of the request for authorization, and
      sends the authorization indicator to the address of the source device after authorization,
   and wherein the source device:
      receives from the e-mail authorization system the authorization indicator,
      adds the received authorization indicator with the included address of the source of the request to the electronic mail message, and
      sends the electronic mail message with the added authorization indicator to the destination device; and
   an intermediate mail system for the destination device, wherein the intermediate mail system:
      receives the electronic mail message with the added authorization indicator from the source device,
      compares the address of the source device sending the received electronic mail message against the address of the source device sending said request for authorization included in the authorization indicator received in the electronic mail message, and
      delivers the electronic mail message to the destination device if the address of the source device sending the received electronic mail message matches the address of the source device sending said request for authorization included in the authorization indicator received in the electronic mail message.

6. The system of claim 5, wherein said authorization indicator is a unique bit string and further identifies the email authorization system.

7. The system of claim 5, wherein the e-mail authorization system is further adapted to track the address of the source device.

8. A method for verifying and tracking unsolicited e-mail sources, the method comprising:
   receiving at an e-mail authorization system from a source device a request for authorization to send an electronic mail message, the request identifying an address of the source of the request;
   authorizing the request with the e-mail authorization system including generating an authorization indicator that includes the address of the source of the request;
   sending a response to the request for authorization from the e-mail authorization system to the address of the source of the request, wherein the response to said request for authorization includes the authorization indicator;
   receiving an electronic mail message from the source device to a destination device at an intermediate mail agent for the destination device, the electronic mail message including the authorization indicator and indication of an address of the source device sending the electronic mail message;
   comparing by the intermediate mail agent for the destination device the indication of the address of the source device sending the electronic mail message included in the received electronic mail message against the address of the source of the request from for authorization included in the authorization indicator received in the electronic mail message; and
   delivering the electronic mail message from the intermediate mail agent for the destination device to the destination device if the indication of the address of the source device sending the electronic mail message included in the received electronic mail message matches the address of the source of the request for authorization included in the authorization indicator received in the electronic mail message.

9. A system comprising:
   an e-mail authorization system, wherein the e-mail authorization system receives from a source device a request for authorization to send an electronic mail message, the request identifying an address of the source of the request, authorizes the request, generates an authorization indicator that includes the address of the source of the request, and sends a response to the request for authorization to the address of the source of the request, wherein the response to said request for authorization includes the authorization indicator with the included address of the source of the request; and
   an e-mail server for a destination device, wherein the e-mail server receives an electronic mail message from the source device to the destination device, the electronic mail message including the authorization indicator and indication of an address of the source device from which the electronic mail message is received, compares the indication of the address of the source device from which the electronic mail message is received included in the received electronic mail message against the address of the source of the request for authorization included in the authorization indicator received in the electronic mail message, and delivers the electronic mail message to the destination device if the indication of the address of the source device from which the electronic mail message is received included in the received electronic mail message matches the address of the source of the request for authorization included in the authorization indicator received in the electronic mail message.

* * * * *

UNITED STATES PATENT AND TRADEMARK OFFICE
CERTIFICATE OF CORRECTION

PATENT NO.        : 8,266,217 B2
APPLICATION NO.   : 10/698813
DATED             : September 11, 2012
INVENTOR(S)       : Osterberg, Jr.

It is certified that error appears in the above-identified patent and that said Letters Patent is hereby corrected as shown below:

The title page showing the illustrative figure should be deleted to be replaced with the attached title page.

In the drawing sheets, consisting of Fig. 4, should be deleted to be replaced with the drawing sheet, consisting of Fig. 4, as shown on the attached pages.

In the Specification:

In column 2, line 45, delete "apart" and insert -- a part --, therefor.

In column 5, line 45, delete "STMP" and insert -- SMTP --, therefor.

In column 6, line 37, delete "storage-component" and insert -- storage component --, therefor.

In column 7, line 32, delete "forwarded" and insert -- forwarded. --, therefor.

In the Claims:

In column 10, line 22, in Claim 8, delete "from for" and insert -- for --, therefor.

Signed and Sealed this
Twenty-fourth Day of December, 2013

Margaret A. Focarino
*Commissioner for Patents of the United States Patent and Trademark Office*

(12) United States Patent
Osterberg, Jr.

(10) Patent No.: US 8,266,217 B2
(45) Date of Patent: Sep. 11, 2012

(54) UNSOLICITED ELECTRONIC MESSAGE SOURCE VERIFICATION AND TRACKING SYSTEM AND METHOD

(75) Inventor: Donald H. Osterberg, Jr., Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1197 days.

(21) Appl. No.: 10/698,813

(22) Filed: Oct. 30, 2003

(65) Prior Publication Data
US 2009/0089375 A1  Apr. 2, 2009

(51) Int. Cl.
*G06F 15/16* (2006.01)
(52) U.S. Cl. ...................................... 709/206
(58) Field of Classification Search .............. 709/206
See application file for complete search history.

(56) References Cited

U.S. PATENT DOCUMENTS

| | | | | |
|---|---|---|---|---|
| 6,167,435 A * | 12/2000 | Druckenmiller et al. | | 709/206 |
| 6,721,784 B1 * | 4/2004 | Leonard et al. | | 709/206 |
| 7,249,175 B1 * | 7/2007 | Donaldson | | 709/225 |
| 7,447,744 B2 * | 11/2008 | Wallace et al. | | 709/206 |
| 2002/0023138 A1 * | 2/2002 | Quine et al. | | 709/206 |
| 2002/0194308 A1 * | 12/2002 | Hall | | 709/219 |
| 2003/0182239 A1 * | 9/2003 | Auzoux | | 705/64 |
| 2003/0200267 A1 * | 10/2003 | Garrigues | | 709/206 |
| 2003/0233418 A1 * | 12/2003 | Goldman | | 709/206 |
| 2003/0236847 A1 * | 12/2003 | Benowitz et al. | | 709/206 |
| 2004/0068542 A1 * | 4/2004 | Lalonde et al. | | 709/206 |
| 2005/0044155 A1 * | 2/2005 | Kaminski et al. | | 709/206 |
| 2005/0080860 A1 * | 4/2005 | Daniell et al. | | 709/206 |
| 2005/0188044 A1 * | 8/2005 | Fleming, III | | 709/206 |
| 2005/0188045 A1 * | 8/2005 | Katsikas | | 709/206 |
| 2006/0010210 A1 * | 1/2006 | Keller | | 709/206 |

* cited by examiner

*Primary Examiner* — Brian P Whipple
(74) *Attorney, Agent, or Firm* — Kilpatrick Townsend & Stockton LLP

(57) ABSTRACT

An unsolicited electronic message source verification and tracking method and system for providing an efficient and convenient mechanism for tracking identification of unsolicited electronic message (e.g., e-mails) sources is presented. In one embodiment, a request for authorization to forward an electronic message is received. The request for authorization includes a request source address. A response is sent including an authorization indicator (e.g., a unique bit string) is sent to the request source address. An electronic message is received and a determination is made if the electronic message includes a valid authorization indictor. If the electronic message does include a valid authorization indicator the electronic message is associated with the request source address and the association is tracked. In one exemplary implementation, a source address included in the electronic message is compared to the request source address and discrepancies are noted.

9 Claims, 5 Drawing Sheets